Nov. 19, 1968   R. C. QUACKENBUSH   3,411,385
POSITIVE FEEDING STRUCTURE
Filed Aug. 8, 1966   2 Sheets-Sheet 1
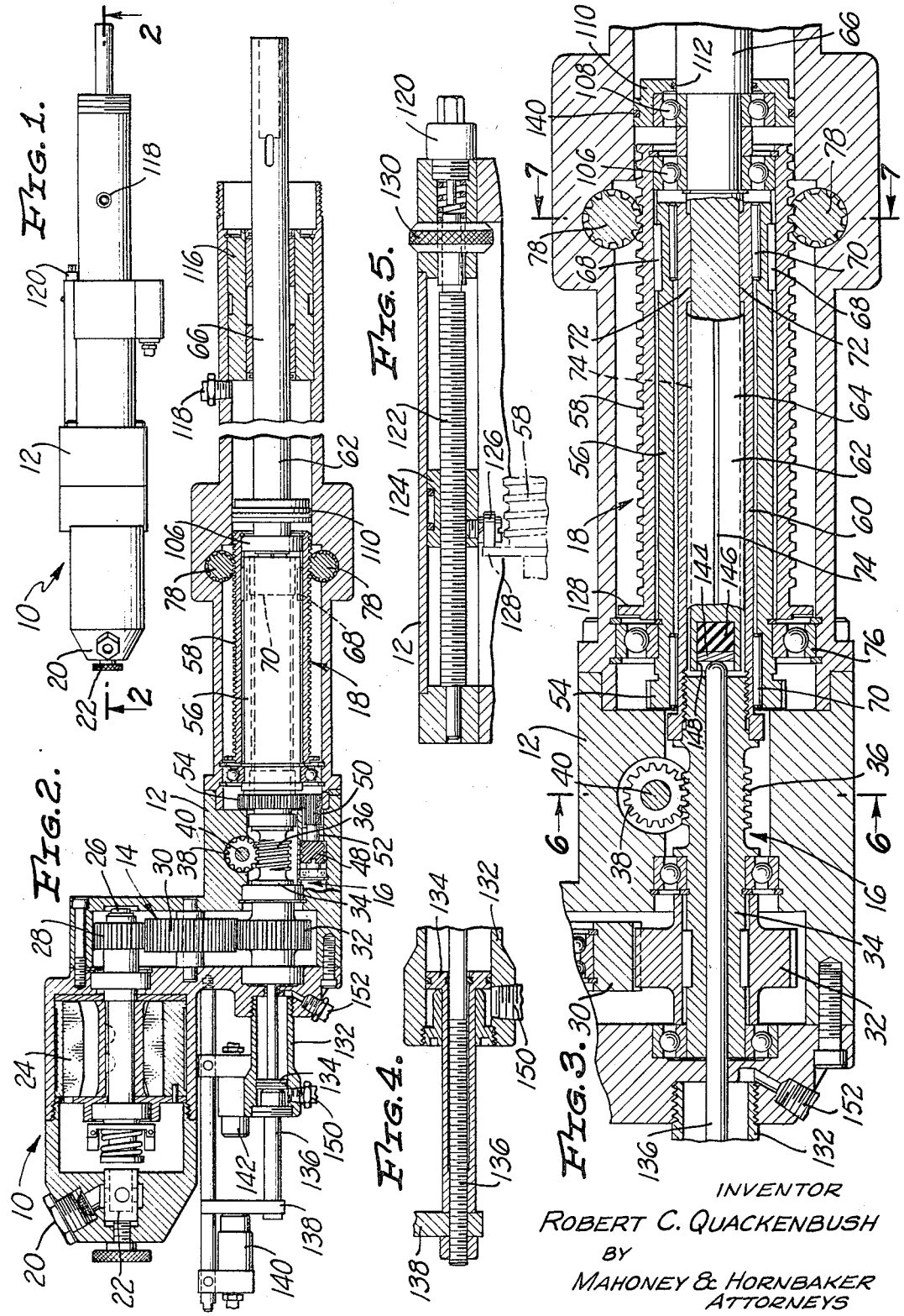
INVENTOR
ROBERT C. QUACKENBUSH
BY
MAHONEY & HORNBAKER
ATTORNEYS Nov. 19, 1968  R. C. QUACKENBUSH  3,411,385

POSITIVE FEEDING STRUCTURE

Filed Aug. 8, 1966  2 Sheets-Sheet 2

INVENTOR
ROBERT C. QUACKENBUSH
BY
MAHONEY & HORNBAKER
ATTORNEYS

United States Patent Office 3,411,385
Patented Nov. 19, 1968

3,411,385
POSITIVE FEEDING STRUCTURE
Robert C. Quackenbush, Glendale, Calif., assignor of one-half to Arthur B. Quackenbush, Glendale, Calif.
Filed Aug. 8, 1966, Ser. No. 570,839
20 Claims. (Cl. 77—32.8)

This invention relates to a positive feeding structure and more particularly, to a positive feeding structure for rotating and feeding tools and the like, such as drills, toward and away from a workpiece. Even more particularly, this invention relates to a positive feeding structure which may be incorporated in a gantry drill for rotating and feeding a drill into working engagement with a workpiece. The principles of the present invention involve the provision of a rapid approach or advance for the drill spindle, a reduced speed feeding of the spindle during the working engagement by the drill and a high speed or rapid retraction of the spindle, all of which may be accomplished in a unique manner and while the lead screw for feeding the spindle during the feeding stroke is constantly, threadably engaged with the means controlling the advancement of the lead screw and spindle during this feeding stroke.

Many prior constructions of feeding devices for rotating and feeding tools, such as drills, toward and away from workpieces have been provided and most of these have made use, during the feeding stroke portion of such movement, of various forms of gears threadably engaged with the lead screw. This has, however, usually been accomplished by the provision of half-nuts or the like movable into threaded engagement with the lead screw in order to commence and carry out this feeding stroke, that is, feeding the lead screw axially and carrying the spindle with this lead screw in order to accomplish the working operation.

If either one or both of rapid advance and rapid retraction is provided in the device, it has been necessary to provide the half-nuts movable into and out of threaded engagement with the lead screw at the beginning and end of the feeding stroke so that at other times during either of the rapid advance or rapid retraction, the lead screw has been unrestricted for axial movement in order that these rapid advance and retraction portions of the movement may take place.

Obviously, in order for two members to be threadably engaged, and move into and out of this threaded engagement without causing damage to the threads of one or the other of the members, it is necessary that they will be exactly aligned, both at the engagement and disengagement. In the case where the engagement must take place at the end of a rapid advance stroke and without undue delay, this proper alignment is extremely difficult to obtain, as is the disengagement at the end of the feeding stroke during the exertion of relatively high axial forces between the threads of the members.

Furthermore, where rapid advance strokes and rapid retraction strokes are provided in a feeding device, it has usually been necessary to provide a multiplicity of high speed gearing which is engaged during these rapid or high speed strokes, yet which must be completely disengaged or at least transferred to a slow speed driving connection, during the reduced speed feeding stroke. This has resulted in feeding devices which are both complex and expensive, as well as relatively difficult and expensive to maintain.

It is, therefore, an object of my invention to provide a positive feeding structure for rotating and feeding tools and the like in which the means controlling the feeding of the lead screw and thus the spindle during the feeding strike, remains threadably engaged with the lead screw throughout any rapid advance and rapid retraction strokes. This is accomplished in the structure of the present invention by providing rotatable threaded means constantly engaged with the lead screw throughout all of the advance, feed and retraction strokes with this threaded means being permitted free rotation during the advance and retraction strokes so that these strokes may be of any determined speed, while the threaded means is retained stationary during the feeding stroke in order to accomplish the threaded feeding of the lead screw and the spindle. The free rotation or retention of this threaded means may be accomplished by simple brake means and the problem of engagement or disengagement of threaded half-nuts with the threaded lead screw is completely eliminated.

It is another object of my invention to provide a positive feeding structure for rotating and feeding tools and the like in which the relatively complex and expensive high speed gearing formerly necessary for accomplishing the rapid advance and retraction strokes is completely eliminated and replaced by relatively simple mechanism operating in a satisfactory and efficient manner for accomplishing the same purpose. In the present structure, both the rapid advance and rapid retraction are produced by forms of fluid cylinders operably connected to the spindle and easily and simply controlled through fluid valves, and all of this taking place while the lead screw remains positively, threadably engaged with the means controlling this lead screw during the feeding stroke. Obviously, fluid cylinders may be much more easily and efficiently controlled for varying stages of movement of the spindle than the previous high speed gear trains.

It is an additional object of my invention to provide a positive feeding structure for rotating and feeding tools and the like of the foregoing type in which the fluid cylinder for the retraction stroke may be incorporated directly on and form a part of the spindle and the spindle housing so as to efficiently provide the retraction stroke, yet with the structure being of maximum compactness. The piston head for the fluid cylinder may be connected directly surrounding a portion of the spindle and movable axially in the spindle housing, sealed to form a proper fluid cylinder. Thus, by selectively admitting fluid, such as air, into the spindle housing and against the piston head connected to the spindle, the spindle is directly and positively driven in an axial direction for the retraction stroke. Furthermore, this eliminates the necessity of providing some form of fluid cylinder exteriorly of the spindle housing and connected through various mechanical connections to the spindle.

Also, it is an object of my invention to provide a positive feeding structure for rotating and feeding tools and the like of the foregoing type in which the drive motor for the structure may be fluid driven, a specific form of brake means serving to control the threaded movement of the lead screw may be fluid actuated, and the foregoing fluid cylinders for the rapid advance and retraction strokes are fluid actuated so that all of the major components are fluid controlled in a single overall fluid control system. In this manner, the overall control of this system is of maximum simplicity, all of these components being controlled through the usual fluid valve arrangements. It is not necessary to incorporate in this control system complex and relatively expensive mechanical control linkages for controlling the engagement and disengagement of various gears and gear trains, since no such gears requiring engagement and disengagement are included therein.

Other objects and advantages of the invention will be apparent from the following specification and the accompanying drawings which are for the purpose of illustration only, and in which:

FIG. 1 is a plan view of a gantry drill incorporating the principles of the present invention;

FIG. 2 is an enlarged, sectional view, part in elevation, taken along the broken line 2—2 in FIG. 1;

FIG. 3 is a still further enlarged, intermediate portion of FIG. 2 and showing further construction details;

FIG. 4 is a still further enlarged, left-hand end portion of FIG. 2 showing certain of the construction details;

FIG. 5 is an enlarged, fragmentary, sectional view taken at the hidden side of FIG. 2 and showing the fluid valve control for the commencement of the spindle rapid retraction stroke with the actuation by the lead screw being shown in broken lines;

Figure 9:
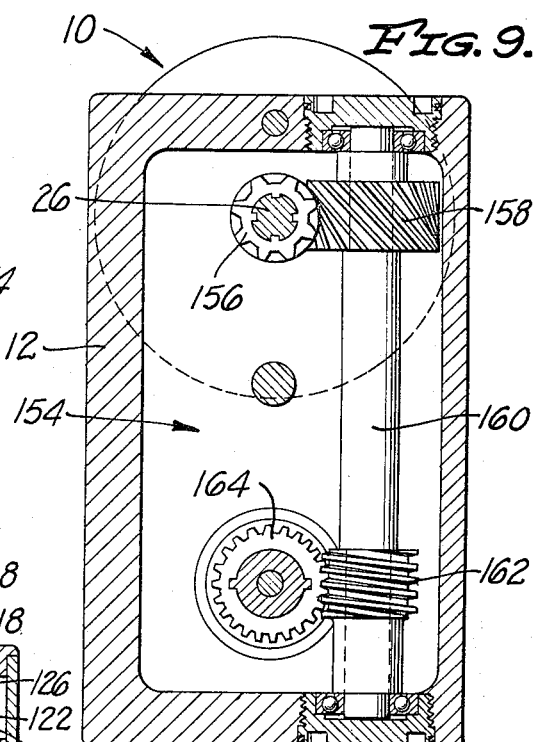
Figure 7:
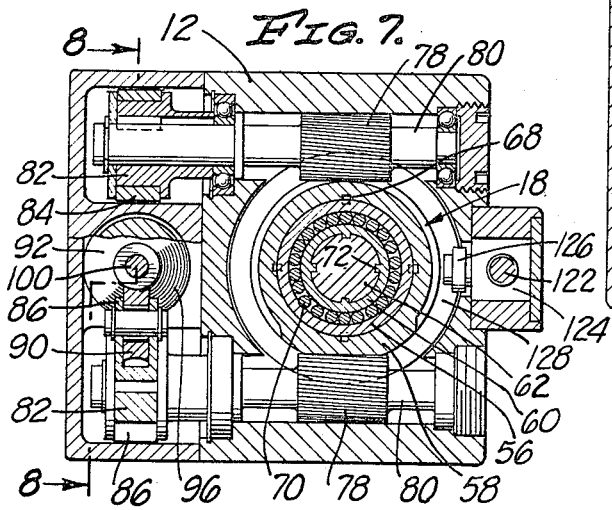
FIG. 7 is a sectional view, part in elevation, taken along the broken line 7—7 in FIG. 3 and showing a part of the lead screw feed control.
Figure 8:
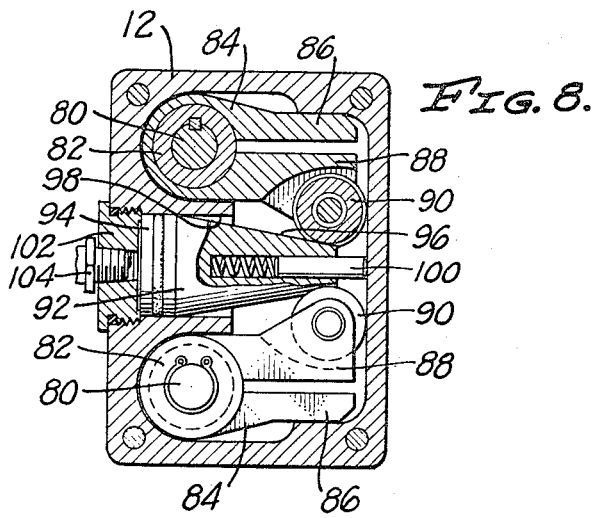

FIG. 8 is a sectional view, part in elevation, taken along the broken line 8—8 in FIG. 7 and showing additional details of the lead screw feed control; and FIG. 9 is a sectional view, part in elevation, taken through the housing outward of the motor drive shaft and the gear train power connection to the main drive shaft, and illustrating an alternate form of power connection between the motor and main drive shafts.

The embodiment of the gantry drill illustrated in the drawings and incorporating the positive feeding structure of the present invention includes a drive motor generally indicated at 10 mounted on a housing generally indicated at 12 operably connected to a cross drive assembly generally indicated at 14 for driving a main drive assembly generally indicated at 16, with this main drive assembly in turn being operably connected to a spindle and lead screw assembly generally indicated at 18. The drive motor 10 may be electrically or fluid driven and, as shown herein, is a variable speed, air driven motor having the air inlet 20 through the variable speed adjustment 22 supplying air to the rotor assembly 24 for rotating the motor shaft 26. The motor shaft 26 mounts the drive gear 28 of the cross drive assembly 14, which drive gear is operably engaged with the idler gear 30 in turn operably engaged with the driven gear 32 connected to the main drive shaft 34 of the main drive assembly 16, and it will be noted, as best seen in FIG. 2, that the housing 12 in the location of the cross drive assembly 14 is conveniently separable for exposing this cross drive assembly, as will be hereinafter discussed.

Figure 6:
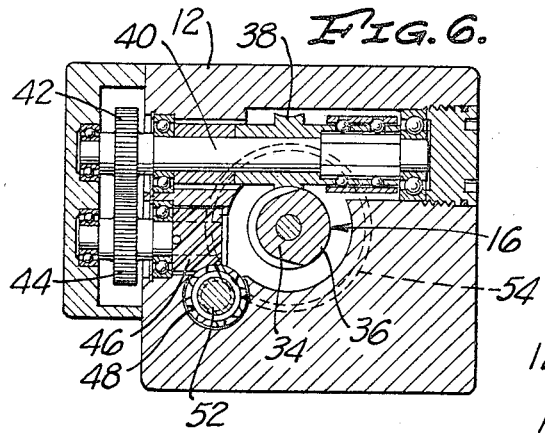
FIG. 6 is a sectional view, part in elevation, taken along the broken line 6—6 in FIG. 3 and showing a part of the power take-off from the main drive shaft for the lead screw rotation.

As shown particularly in FIGS. 2, 3 and 6, the main drive shaft 34 is connected to the driven gear 32 at the inner end of this shaft and axially adjacent the driven gear is formed with the worm gear 36 engaged with the worm wheel 38 rotatable in the housing 12 radially adjacent the main drive shaft. Worm wheel 38 is in turn connected for driving the auxiliary shaft 40 and thereby in turn the gears 42, 44, 46 and 48, as best seen in FIG. 6. As shown in FIG. 2, gear 48 is connected for driving the gear 50 through the auxiliary shaft 52 with gear 50 being engaged with the lead screw rotating gear 54 formed at the inner end of the lead screw carrier 56 which forms a part of the spindle and lead screw assembly 18.

The spindle and lead screw assembly 18 includes the previously mentioned lead screw carrier 56, lead screw 58, spindle carrier 60 and spindle 62, with the spindle being formed by the inner and outer portions 64 and 66. Lead screw 58 is telescoped over the lead screw carrier 56 and is secured for rotation therewith by the keys 68, while the lead screw carrier 56 is telescoped over the spindle carrier 60 and is rotatable relative thereto through the axially spaced needle bearings 70. Spindle carrier 60 is telescoped over the inner portion 64 of spindle 62 with the inner end of this spindle carrier being secured to the outer end of the main drive shaft 34 for rotation by the main drive shaft, and with the outer end of this spindle carrier being keyed to the spindle through the circumferentially spaced key portions 72 axially, slidably received in the key slots 74 of the spindle.

All of the lead screw carrier 56, lead screw 58, spindle carrier 60 and the inner portion 64 of spindle 62 are rotatable within the housing 12 by the bearing 76 at the inner end of the lead screw carrier 56 between this carrier and the housing, and the diametrically opposed lead screw control gears 78 axially spaced from bearing 76 and threadably engaged with the lead screw 58. Thus, the spindle carrier 60 and spindle 62 are rotatable within the housing 12 and driven by the main drive shaft 34, and the lead screw carrier 56 and lead screw 58 are rotatable within the housing and driven by the main drive shaft 34 but capable of rotation relative to the spindle carrier and spindle. Furthermore, the spindle carrier 60 is axially stationary in the housing 12 while the spindle 62 is axially movable relative thereto, and the lead screw carrier 56 is axially stationary in the housing while the lead screw 58 is axially movable relative thereto.

As shown in FIG. 7, the lead screw control gears 78 are secured to the auxiliary shafts 80 rotatable in the housing 12 with the brake drums 82 being secured to the ends of these auxiliary shafts axially spaced from the lead screw control gears. Furthermore, as shown in FIGS. 7 and 8, the split gripping bars 84 are telescoped over the brake drums 82 with the stationary legs 86 of these gripping bars abutting the housing 12 and the spaced movable legs 88 rotatably mounting the aligned and opposed wedge rollers 90. Gripping bars 84 are formed so as to permit rotation of the brake drums 82 relative thereto in the nongripping positions, as shown in FIG. 8, but when the movable legs 88 of these gripping bars are flexed toward the stationary legs 86 thereof to reduce the spacing therebetween, these gripping bars will securely grip the clutch drums and retain these drums against rotation.

A brake plunger 92 having the cylindrical piston head portion 94 and frusto-conical wedge portion 96 is axially, slidably mounted in the housing 12, with the piston head portion slidably sealed within the housing opening 98 and the wedge portion extending between and radially abutting the wedge rollers 90. A spring urged push rod 100 projects axially from the wedge portion 96 and bears against the housing 12, and a closure 102 axially overlies the piston head portion 94 and is formed with the fluid connection, in this case, air connection 104.

Thus, the housing opening 98 with the closure 102 forms an air cylinder and the piston head portion 94 of the brake plunger 92 forms the piston thereof. Admitting air through the air connection 104 will force the brake plunger 92 axially away from the closure 102 depressing the push rod 100 and causing the wedge portion 96 of this brake plunger to force the wedge rollers 90 outwardly and flex the gripping bars 84 to grip the brake drums 82. Release of the air pressure permits the push rod 100 to resiliently force the brake plunger 92 axially back toward the closure 102, releasing the gripping bars 84 and permitting free rotation between these grippings bars and the brake drums 82.

Returning to FIGS. 2 and 3, the outer end of the inner portion 64 of spindle 62 is rotatably supported in the outer end of the lead screw 58 by the bearing 106, with this bearing being axially secured to both the spindle and lead screw, thereby providing relative rotation therebetween but requiring simultaneous axial movement thereof. For this reason, axial movement of the spindle 62 will force axial movement of the lead screw 58 and conversely, axial movement of the lead screw 58 will force axial movement of the spindle 62. Thus, either may axially drive the other.

A bearing 108 is secured to the inner end of the spindle outer portion 66 adjacent the bearing 106 and a piston head 110 is mounted on the bearing 108 for relative rotation between this piston head and the spindle outer portion. Furthermore, the piston head 110 is outwardly sealed against the spindle outer portion 66 by the rotatable seal 112 and is axially, slidably sealed in the housing 12 by the slidable seal 114. Thus, the spindle outer portion 66 and the piston head 110 are secured for unitary axial movement, but the spindle outer portion may rotate relative to the piston head.

As shown in FIG. 2, the spindle outer portion 66 is rotatably and axially, slidably sealed at the right-hand end of the housing 12, as viewed in FIG. 2, by the sleeve bearing assembly 116 and a fluid connection, in this case an air connection 118, is mounted extending through the housing inwardly adjacent this sleeve bearing assembly. Thus, the housing 12 and the spindle outer portion 66 with the piston head 110 form a fluid cylinder, which will tend to force the spindle 62 axially inwardly relative to the housing when air pressure is admitted through the air connection 118.

The admittance of air through the air connection 118 is controlled by the poppet valve 120, shown in FIG. 5, which is actuated by the rod 122 axially, movably mounted in the housing 12. Rod 122 is also rotatable relative to the housing 12 and is threadably engaged with a block 124 having the engagement screw 126 secured therein. Engagement screw 126 projects radially from the block 124 and is radially adjacent the lead screw 58 in axial interference with the engagement flange 128 on lead screw 58 so that at a predetermined moment in the outward axial movement of the lead screw 58 and the spindle 62, the engagement flange 128 of the lead screw will strike the engagement screw 126 forcing the rod 122 axially to engage the poppet valve 120 and this moment of engagement may be adjusted by selectively rotating the adjustment wheel 130 on rod 122 to adjust the axial position of the block 124.

Referring to FIGS. 2 and 4, a fluid cylinder 132 is mounted on the housing 12 axially aligned with the main drive shaft 34 and spindle 62 at the inner end of this main drive shaft. A piston head 134 is axially, slidably mounted in the cylinder 132 secured on a piston rod 136 extending completely axially through the cylinder 132. The outer end of this piston rod 136 is secured to a plate 138 axially slidable along the housing 12 between the poppet valves 140 and 142, and the inner end of this piston rod 136 extends axially through the main drive shaft 34 within a portion of the spindle carrier 60 and is axially engageable with a bumper plate 144 backed by a resilient pad 146 and contained within an axial recess 148 formed in the inner end of the spindle 62.

Fluid connections, in this case air connections 150 and 152 are provided at opposite ends of the cylinder 132, and all of the poppet valves previously mentioned are provided with appropriate air connections for incorporation in the overall air system, not shown. Furthermore, this air control system is of usual form and for operating the various components in order to carry out the operation of the structure, as will be described below. The various poppet valves may be connected for operating usual large capacity shuttle valves in this air system and in the usual manner.

In operation of the embodiment of the gantry drill just described, the drive motor 10, properly adjusted for the desired speed, is started so as to rotate both the lead screw 58 and spindle 62. At this stage, there is no air admitted to the clutch plunger 92 so that the lead screw control gears 78 are freely rotatable and will have no effect as to axially moving the lead screw 58 despite the rotation of this lead screw. Further, there is free egress of air from the housing 12 surrounding the spindle outer portion 66 so that there is no air pressure preventing the axial movement outwardly of the spindle 62 and lead screw 58.

To begin the rapid advance stroke of the spindle 62 and therefore also the lead screw 58, air is admitted through the air connection 150 driving the piston rod 136 axially and this piston rod in turn forcing the spindle 62 with the lead screw 58 axially. The speed of this advance stroke is determined by the pressure and volume of the air admitted for axially driving the piston rod 136 and may be relatively high speed. Furthermore, there is little resistance to this advance stroke so that a great axial force is not required since at this stage, there will be no work engagement by a tool, not shown, carried and rotated by the spindle 62.

At the end of this advance stroke, the plate 138 on piston rod 136 engages the poppet valve 142 which admits air to drive the brake plunger 92 axially, causing the gripping bars 84 to grip the brake drums 82 and retain the lead screw control gears 78 stationary. This begins the reduced or slow speed feeding stroke and the lead screw control gears 78 will axially feed the lead screw 58 with the spindle 62 outwardly during the actual working operation. The retention of the lead screw control gears 78 and the threaded engagement between these gears and the lead screw 58 will provide the necessary axial force for this feeding stroke and the working operation.

At the end of the feeding stroke, the flange 128 on the lead screw 58 engages the engagement screw 126 forcing the rod 122 axially to actuate the poppet valve 120. The actuation of the poppet valve 120 releases the air on the clutch plunger 92 permitting the push rod 100 to force this plunger axially to the position shown in FIG. 8 and releasing the lead screw control gears 78 for resuming free rotation. At the same time, this poppet valve 120 admits air through the air connection 118 into the housing 12 against the piston head 110 on the spindle 62, and also admits air through the connection 152 to ultimately aid in returning the piston rod 136 to its starting position shown in FIG. 2. This begins the rapid retraction stroke and forces the spindle 62 with the lead screw 58 axially inwardly until this spindle and lead screw are finally in their starting positions shown in FIG. 2. Intermediate this retraction stroke, the piston rod 136 is picked up by the spindle 62 and forced axially to the starting position, at which time, the plate 138 carried by this piston rod strikes the poppet valve 140 and shuts down the entire air system so as to stop the drive motor 10 and cease rotation of the spindle and lead screw.

In the embodiment of the gantry drill incorporating the positive feeding structure of the present invention, as shown in FIGS. 1 through 8, the drive motor 10 is preferably a three horsepower air motor providing through the particular gearing illustrated a speed range for the spindle 62 in the order of 2,500 to 5,000 r.p.m., with the particular speed being determined by the adjustment of the variable speed adjustment 22 on the drive motor. In the event it is desired to provide a different speed range, for instance, a lower speed range, it is merely necessary to change the cross drive assembly 14 which is readily accessible in view of its particular location and the quick disconnect of the housing at this point, as shown in FIG. 2 and previously discussed. For this lower speed drive, the cross drive assembly 14 is removed and replaced by the cross drive assembly 154 shown in FIG. 9.

This low speed cross drive assembly 154 includes the drive gear 156 on the motor shaft 26 engaged with the driven gear 158 secured on the rotatable auxiliary shaft 160, and the worm 162 secured on the auxiliary shaft and driving the worm wheel 164 secured on the main drive shaft 34. With this arrangement, the speed ratio is changed such that spindle speeds as low as 150 r.p.m. can be obtained.

Thus, according to the principles of the present invention, a positive feed structure is provided in which the lead screw is positively, threadably engaged at all times with the means controlling this lead screw during the rapid advance and rapid retraction strokes, as well as during the feeding stroke. The lead screw 58 is controlled by the lead screw control gears 78 which are freely rotatable during these rapid advance and retraction strokes, yet are secured against rotation for proper feeding of the feed screw 58 by a unique brake assembly during the feeding stroke. The problems of engaging and disengaging gearing with the lead screw is, therefore, completely eliminated.

Furthermore, with the embodiment of the construction shown, the entire cycle is simply controlled by the use of an air system incorporating a series of poppet valves so that the system may be readily adapted for automatic predetermined operation. Also, by forming one of the major air cylinders which serves to provide the rapid retraction stroke formed as a part of the housing 12 and a part of the spindle 62, an extremely compact structure is provided. Still further, by providing the cross drive assemblies 14 or 154 located in the housing 12 in the particular manner shown and described, these cross drive assemblies are readily accessible for changing the speed ratios of the spindle 62 so that virtually any speed ratio desired may be easily incorporated.

I claim:

1. In a positive feeding structure for rotating and feeding tools and the like, the combination of: a housing; a spindle rotatably mounted in said housing; a lead screw rotatably mounted in said housing and operably connected to said spindle for axial movement with said spindle; means operably connected to said spindle and said lead screw for constantly rotating said spindle and lead screw in single directions of rotation during axial movement of said spindle and lead screw from a retracted position in a high speed advance stroke, in a reduced speed feeding stroke in the same axial direction as said advance stroke and a retraction stroke back to said retracted position; means operably connected to said spindle and lead screw for axially moving said spindle and lead screw in said high speed advance stroke; means threadably engaged with said lead screw for axially moving said spindle and lead screw through said lead screw threaded engagement in said reduced speed feeding stroke, said last mentioned means remaining threadably engaged with said lead screw throughout said spindle and lead screw high speed advance stroke and reduced speed feeding stroke and retraction stroke; and means operably connected to said spindle and lead screw for axially moving said spindle and lead screw in said retraction stroke.

2. A positive feeding structure as defined in claim 1 in which said means threadably engaged with said lead screw includes rotatable gear means for controlling axial movement of said spindle and lead screw during said reduced speed feeding stroke.

3. A positive feeding structure as defined in claim 1 in which said means threadably engaged with said lead screw includes rotatable gear means freely rotatable during said high speed advance and retraction strokes for permitting said strokes and stationary during said reduced speed feeding stroke for controlling said stroke, and brake means operably associated with said gear means for permitting free rotation of said gear means during said high speed advance and retraction strokes and retaining said gear means stationary during said reduced speed feeding stroke.

4. A positive feeding structure as defined in claim 1 in which said means operably connected to said spindle and lead screw for axially moving said spindle and lead screw in said high speed advance stroke includes a fluid cylinder.

5. In a positive feeding structure for rotating and feeding tools and the like, the combination of: a housing; a spindle rotatably mounted in said housing and axially movable; a lead screw rotatably mounted in said housing and axially movable with said spindle; means operably connected to said spindle and lead screw for constantly rotating said spindle and lead screw in single directions of rotation during axial movement of said spindle and lead screw from a retracted position in an advance stroke, a slow speed feeding stroke in the same axial direction as said advance stroke, and a high speed retraction stroke back to said retracted position; means operably connected to said spindle and lead screw for axially moving said spindle and lead screw in said advance stroke; means threadably engaged with said lead screw for axially moving said spindle and lead screw in said slow speed feeding stroke; and means operably connected to said spindle and lead screw for moving said spindle and lead screw axially in said high speed retraction stroke, said last mentioned means including fluid cylinder means formed partially by a portion of said housing transversely surrounding a part of said spindle and partially by a piston head connected to and transversely surrounding said spindle for axial movement in said housing portion.

6. A positive feeding structure as defined in claim 5 in which said means threadably engaged with said lead screw includes gear means positioned for constant full engagement with said lead screw throughout said advance and feeding and retraction strokes, and means operably connected with said gear means for controlling rotation of said gear means during said strokes.

7. A positive feeding structure as defined in claim 5 in which said means threadably engaged with said lead screw includes rotatable gear means positioned for constant full engagement with said lead screw throughout said advance and feeding and retraction strokes, and brake means actionable during certain of said strokes for controlling rotation of said gear means.

8. A positive feeding structure as defined in claim 5 in which said axial movement of said lead screw at the termination of said feeding stroke actuates said means for moving said spindle and lead screw in said retraction stroke causing fluid to be directed into said fluid cylinder means.

9. In a positive feeding structure for rotating and feeding tools and the like, the combination of: a housing; a spindle rotatably mounted in said housing and axially movable; a lead screw rotatably mounted in said housing and axially movable with said spindle; means operably connected to said spindle and lead screw for constantly rotating said spindle and lead screw in single directions of rotation during axial movement of said spindle and lead screw from a retracted position in a high speed advance stroke, a reduced speed feeding stroke in the same axial direction as said advance stroke and a high speed retraction stroke back to said retracted position; means operably connected to said spindle and lead screw for moving said spindle and lead screw in said high speed advance stroke; means threadably engaged with said lead screw for moving said spindle and lead screw in said reduced speed feeding stroke, said last mentioned means being positioned fully threadably engaged with said lead screw throughout said advance and feeding and retraction strokes; and means operably connected to said spindle and lead screw for moving said spindle and lead screw in said high speed retraction stroke.

10. A positive feeding structure as defined in claim 9 in which said means threadably engaged with said lead screw includes rotatable gear means for moving said spindle and lead screw during said feeding stroke, and means operably associated with said gear means for controlling rotation of said gear means.

11. A positive feeding structure as defined in claim 9 in which said means threadably engaged with said lead screw includes rotatable gear means for moving said spindle and lead screw in said feeding stroke, and brake means operably associated with said gear means for permitting free rotation of said gear means during said advance and retraction strokes and retaining said gear means stationary during said feeding stroke.

12. A positive feeding structure as defined in claim 9 in which said means threadably engaged with said lead screw includes a pair of rotatable gears mounted at radially opposite sides of said lead screw, said gears being secured to shafts, and brake means operably associated with said gear shafts for releasing said gear shafts during said advance and retraction strokes and gripping said shafts during said feeding stroke.

13. A positive feeding structure as defined in claim 9 in which said means threadably engaged with said lead screw includes a pair of rotatable gears mounted at radially opposite sides of said lead screw, said gears being secured on shafts, and brake means operably associated with said shafts for permitting free rotation of said shafts during said advance and retraction strokes and gripping said shafts against rotation during said feeding stroke, said brake means including gripping members positioned for gripping said shafts and retaining said shafts against rotation, and said brake means including wedge means movable to wedge said gripping members into shaft gripping positions.

14. A positive feeding structure as defined in claim 9 in which said means threadably engaged with said lead screw includes a pair of rotatable gears positioned at opposite sides of said lead screw, said gears being secured to shafts, a pair of gripping members surrounding said shafts, a roller on each gripping member, a wedge member engaged with said gripping member rollers and movable to wedge said rollers and thereby wedge said gripping members to a shaft gripping position, and fluid cylinder means operably connected to said wedge member for moving said wedge member to a roller wedging position.

15. A positive feeding structure as defined in claim 9 in which said means operably connected to said spindle and lead screw for moving said spindle and lead screw in said high speed advance stroke includes a fluid cylinder; and in which said means operably connected to said spindle and lead screw for moving said spindle and lead screw in said high speed retraction stroke includes a fluid cylinder.

16. A positive feeding structure as defined in claim 9 in which said means operably connected to said spindle and lead screw for moving said spindle and lead screw in said high speed retraction stroke includes a fluid cylinder, said fluid cylinder being formed partially by a portion of said housing transversely surrounding a part of said spindle and partially by a piston head connected to and transversely surrounding said spindle part axially slidable in said housing portion.

17. A positive feeding structure as defined in claim 9 in which said means operably connected to said spindle and lead screw for moving said spindle and lead screw in said high speed advance stroke includes a fluid cylinder; and in which said means operably connected to said spindle and lead screw for moving said spindle and lead screw in said high speed retraction stroke includes a fluid cylinder, said fluid cylinder being formed partially by a portion of said housing transversely surrounding a part of said spindle and partially by a piston head connected to and transversely surrounding said spindle part axially slidable in said housing portion.

18. A positive feeding structure as defined in claim 9 in which said means operably connected to said spindle and lead screw for moving said spindle and lead screw in said high speed advance stroke includes a fluid cylinder; in which said means operably connected to said spindle and lead screw for moving said spindle and lead screw in said high speed retraction stroke includes a fluid cylinder; and in which said means threadably engaged with said lead screw includes rotatable gear means fully threadably engaged with said lead screw throughout said advance and feeding and retraction strokes, and fluid control means operably associated with said gear means for permitting free rotation of said gear means during said advance and retraction strokes and retaining said gear means against rotation during said feeding stroke.

19. A positive feeding structure as defined in claim 9 in which said means operably connected to said spindle and lead screw for moving said spindle and lead screw in said high speed advance stroke includes a fluid cylinder; in which said means operably connected to said spindle and lead screw for moving said spindle and lead screw in said high speed retraction stroke includes a fluid cylinder; in which said means threadably engaged with said lead screw includes rotatable gear means fully threadably engaged with said lead screw throughout said advance and feeding and retraction strokes, and fluid control means operably associated with said gear means for permitting free rotation of said gear means during said advance and retraction strokes and retaining said gear means against rotation during said feeding stroke; in which said fluid control means is operably connected to said means for moving said spindle and lead screw in said advance stroke for actuating said fluid control means at the end of said advance stroke to begin retention of said gear means; and in which said fluid control means is operably connected to said spindle and lead screw for terminating actuation of said fluid control means at the end of said feed stroke to release said gear means for free rotation.

20. A positive feeding structure as defined in claim 9 in which said means threadably engaged with said lead screw includes rotatable gear means mounted engaged with said lead screw, and control means for said gear means permitting free rotation of said gear means during said advance and retraction strokes and maintaining said gear means stationary during said feeding stroke.

References Cited

UNITED STATES PATENTS

| | | | |
|---|---|---|---|
| 2,869,403 | 1/1959 | Bent | 77—34.4 XR |
| 3,178,740 | 4/1965 | Dorak | 77—34.4 XR |

FOREIGN PATENTS 991,082  5/1965  Great Britain.

FRANCIS S. HUSAR, *Primary Examiner.*